United States Patent [19]

Muller

[11] 4,304,077
[45] Dec. 8, 1981

[54] MOUNTING ASSEMBLY FOR HYDRAULIC CONDUITS OF A MOBILE APPARATUS

[75] Inventor: Thomas P. Muller, Aurora, Ill.
[73] Assignee: Caterpillar Tractor Co., Peoria, Ill.
[21] Appl. No.: 98,144
[22] PCT Filed: Jul. 16, 1979
[86] PCT No.: PCT/US79/00503
§ 371 Date: Jul. 16, 1979
§ 102(e) Date: Jul. 16, 1979
[87] PCT Pub. No.: WO81/00273
PCT Pub. Date: Feb. 5, 1981
[51] Int. Cl.³ ............................................. B66C 23/06
[52] U.S. Cl. ................................... 52/115; 248/68 R; 414/918
[58] Field of Search .......................... 52/115, 116, 117; 138/110; 285/45; 137/377, 378; 248/66, 68 R, 73, 632, 635; 414/918

[56] References Cited

U.S. PATENT DOCUMENTS

| | | | |
|---|---|---|---|
| 2,227,528 | 1/1941 | Adler | 248/632 X |
| 2,288,158 | 6/1942 | Ellinwood | 248/632 X |
| 2,967,726 | 1/1961 | Weston | . |
| 3,220,676 | 11/1965 | Butts | 248/635 |
| 3,797,539 | 3/1974 | Moser et al. | 144/3 D |
| 3,996,982 | 12/1976 | Oldenburg | 144/34 E |
| 4,020,531 | 5/1977 | Ahrens et al. | 24/284 |
| 4,030,540 | 6/1977 | Roma | 165/172 |
| 4,034,874 | 7/1977 | Collins | 248/68 R X |
| 4,108,224 | 8/1978 | Wirt | 144/34 E |

OTHER PUBLICATIONS

"It Cuts More Than Trees", Caterpillar 950 Tree Harvester sales brochure.
"The Cat 950 Tree Harvester", sales brochure.

Primary Examiner—Price C. Faw, Jr.
Assistant Examiner—Carl D. Friedman
Attorney, Agent, or Firm—Wegner, Stellman, McCord, Wiles & Wood

[57] ABSTRACT

A mobile apparatus (20) has a hydraulically operated pivoted boom (22) and a hydraulically operated pivoted arm (24) and on the free end of the arm is a hydraulically operated mechanism (26) for handling heavy loads in ways that cause torsional and bending distortion of the boom (22) and the arm (24). Coplanar steel hydraulic conduits (42a and 42b, and 45a and h to 50a and b) are slidably carried in conduit support blocks (57); and those blocks in turn are mounted on brackets (53) fixed to the arm (24) or brackets (69) fixed to the boom (22) by carrying means (56 or 72) which allows directionally unrestricted limited movement of the blocks (57) in a plane parallel to that of the conduit centers, and which also allows axial movement along lines perpendicular to that plane.

7 Claims, 10 Drawing Figures

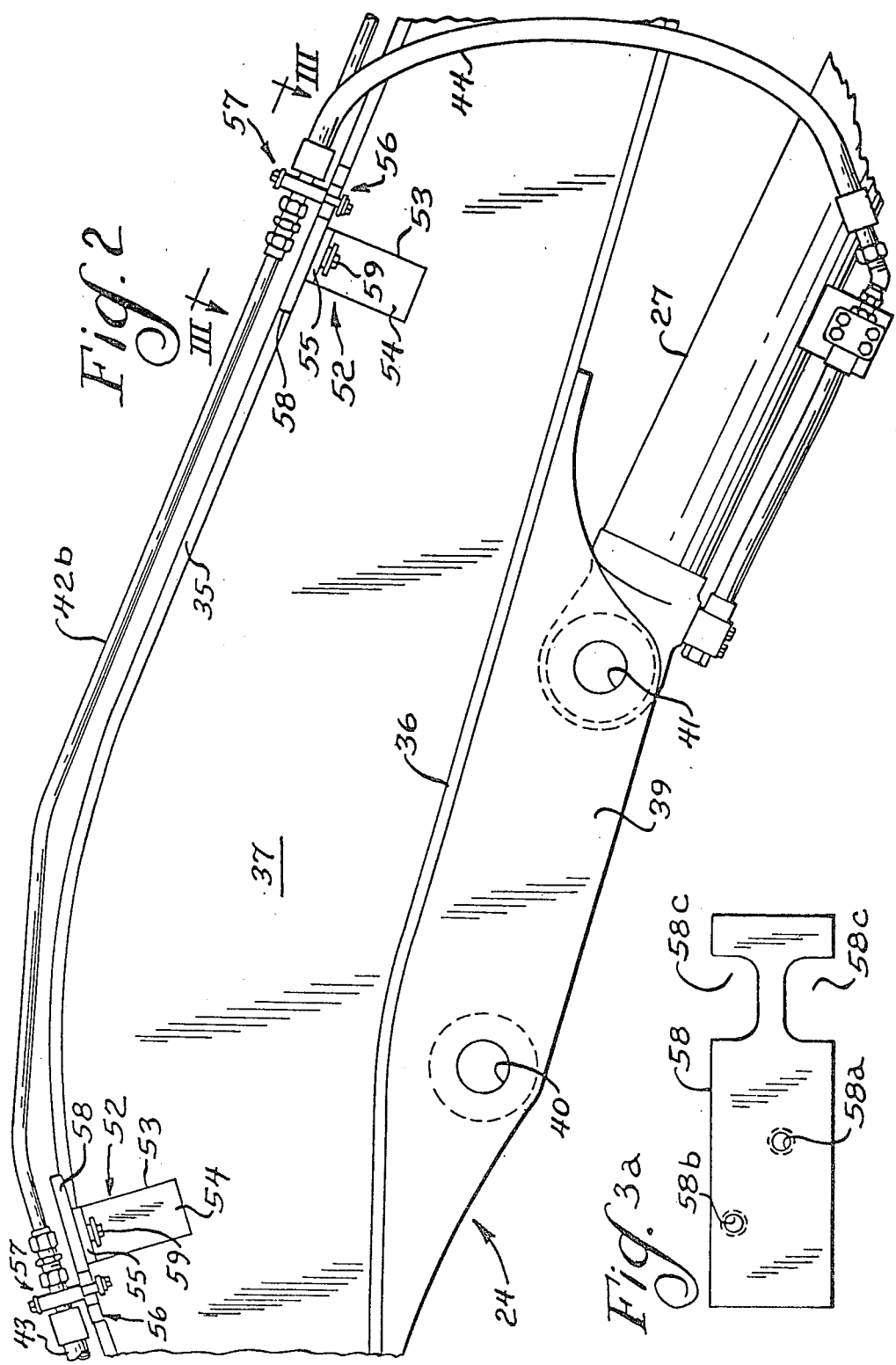

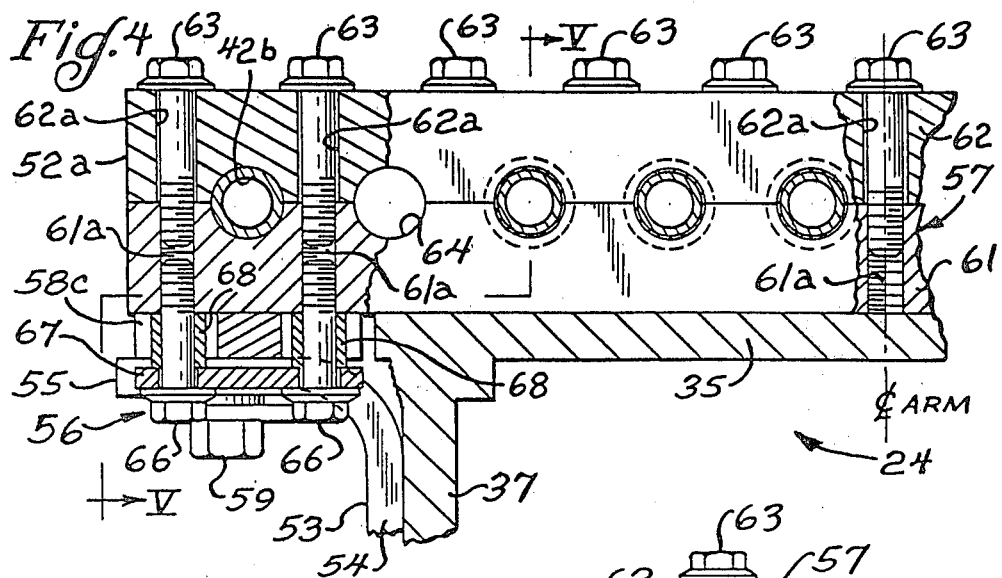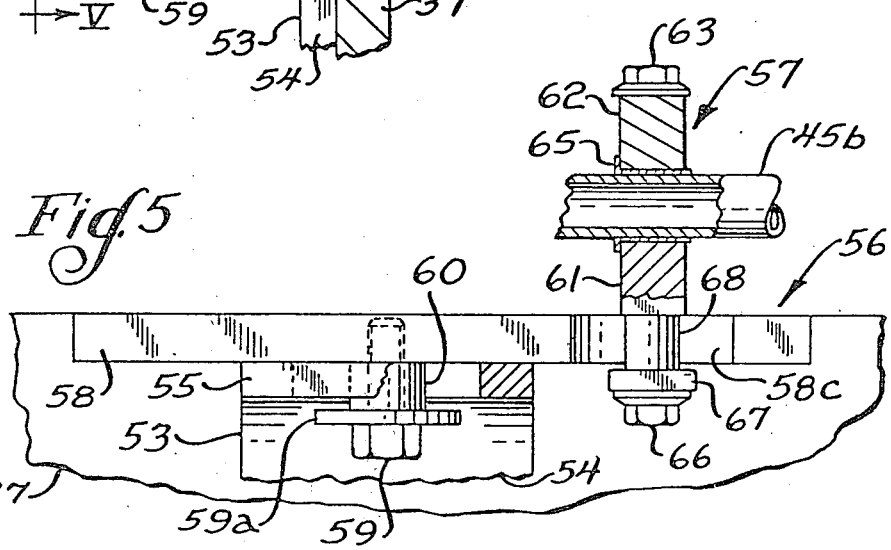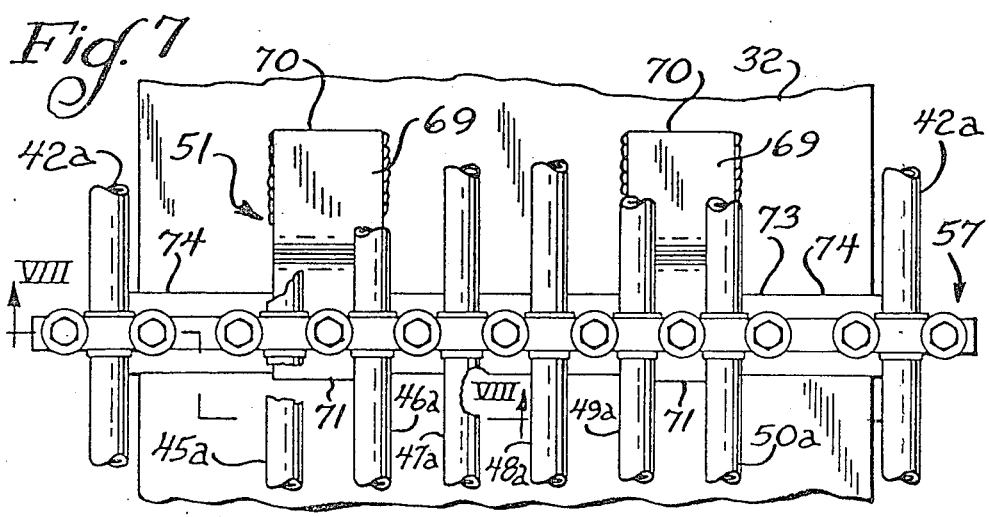

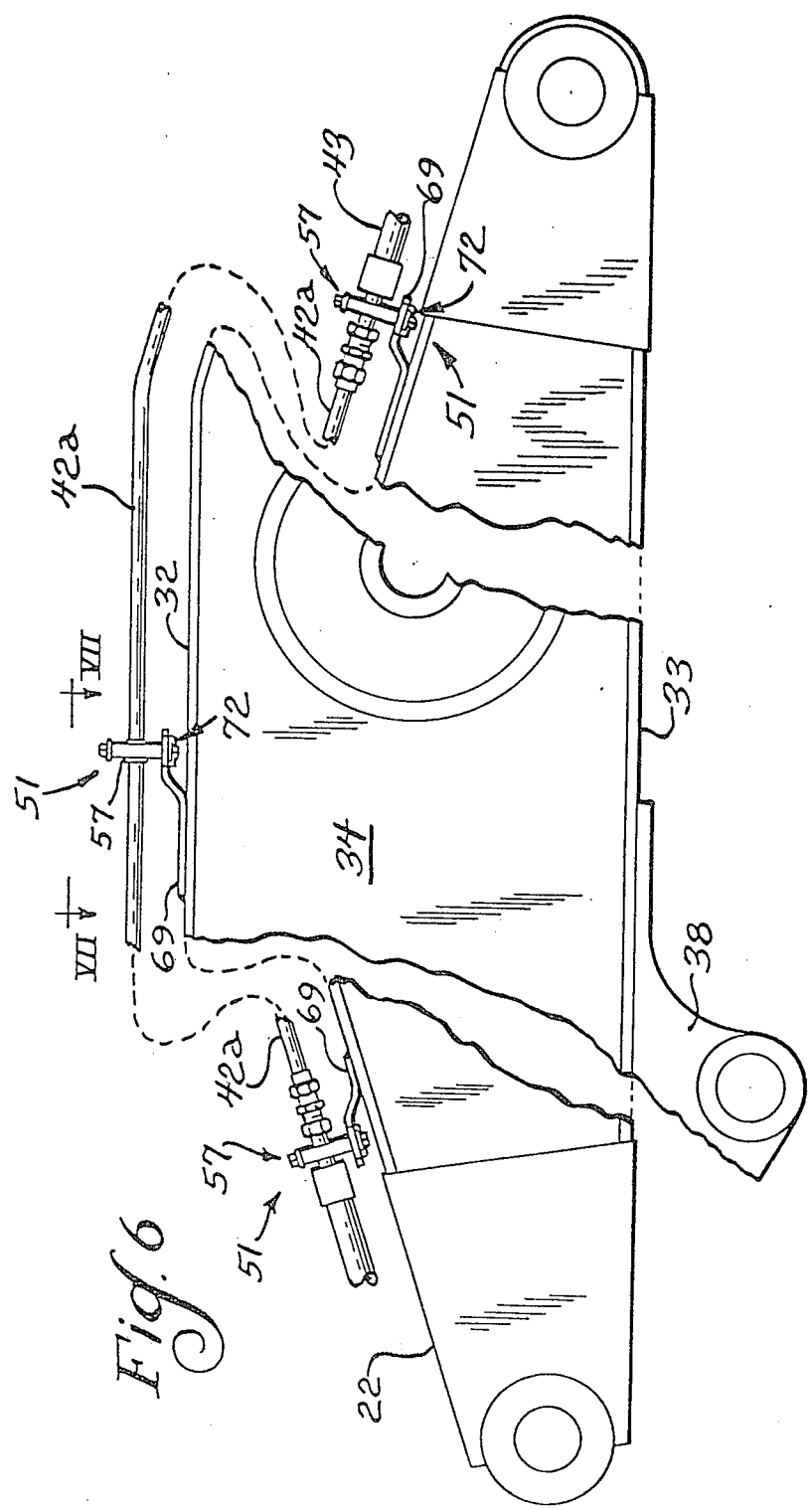

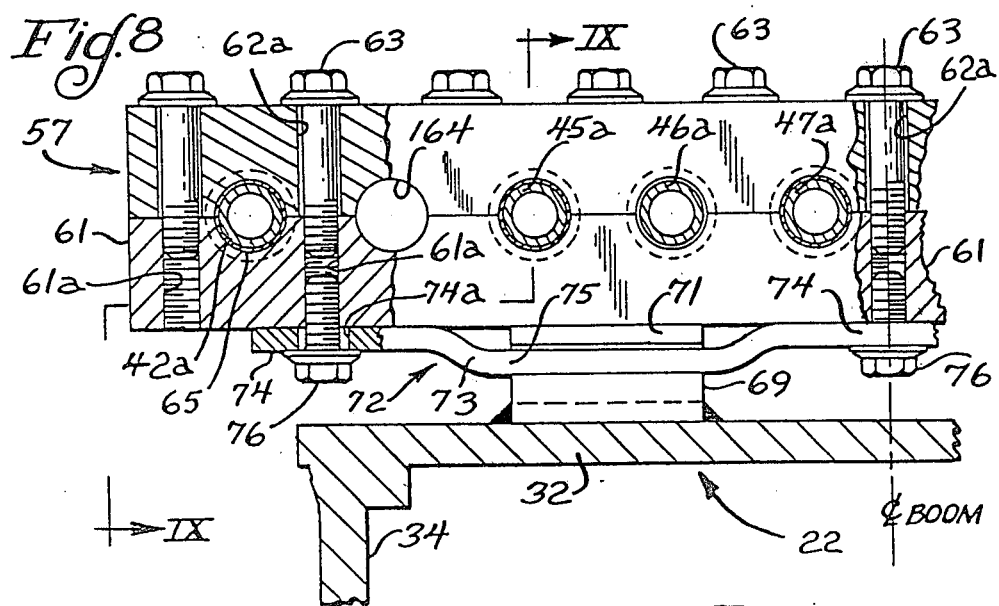
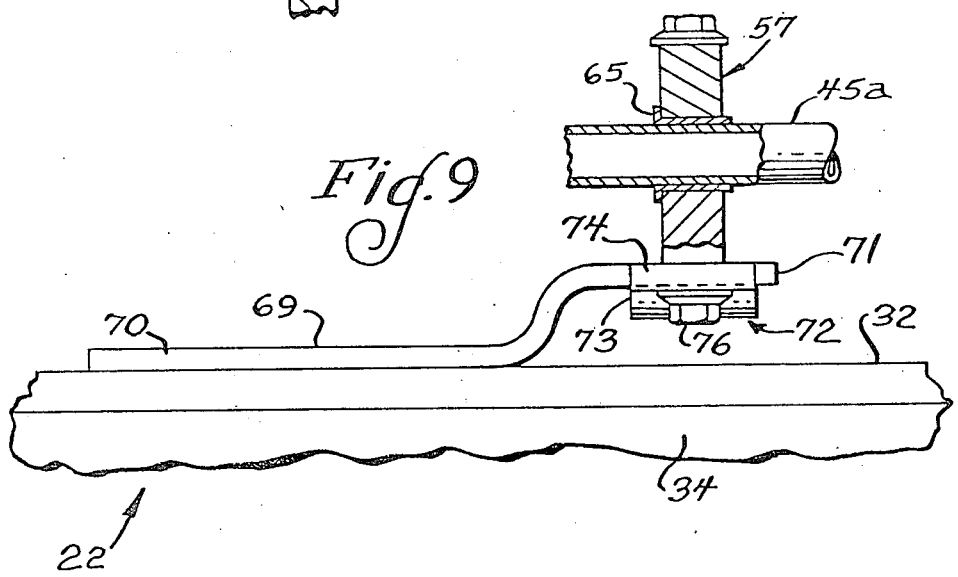

MOUNTING ASSEMBLY FOR HYDRAULIC CONDUITS OF A MOBILE APPARATUS

TECHNICAL FIELD

This invention relates to an assembly for mounting a plurality of rigid hydraulic conduits on a beam member of a mobile apparatus in which a hydraulically operated mechanism on the free end of the beam member is used for handling heavy loads.

BACKGROUND ART

There are various types of mobile devices which are used for handling, or manipulating heavy loads. Many of them, like hydraulic excavators, have a chassis on which a boom member is pivotally mounted, there is an arm member pivoted at the free end of the boom, and an excavator bucket or other hydraulically operated apparatus is at the free end of the arm. Hydraulically operated mechanisms mounted on such devices in place of excavator buckets include tree harvesting devices, log grapples, hydraulic impact hammers, pile drivers or earth compactors, etc.

Such devices are usually used in very rough environments where the hydraulic conduits on the boom and on the arm are subject to severe stresses; and particularly with such attachments as tree harvesters and log grapples the boom and the arm may be subjected to severe torsional strain which can damage the conduits. In addition, the heavy vibrations developed in such apparatus cause metal fatigue in the conduits and loosen conduit connections. These factors, plus the rough conditions of use, complicate the development of appropriate conduit mountings for the boom and the arm. The rigid hydraulic conduits must be firmly supported, but they must be free to move slightly in all directions relative to the boom, or the arm, as the case may be, to minimize conduit damage and connection problems in operation.

DISCLOSURE OF INVENTION

The present invention is directed to overcoming one or more of the problems as set forth above.

According to the present invention, a mobile apparatus having a hydraulically operated, pivotally mounted beam means which carries a hydraulically operated mechanism for handling heavy loads has a mounting assembly for mounting a plurality of rigid hydraulic conduits on the beam means. The mounting assembly includes bracket means fixedly mounted on the beam means, a hydraulic conduit support block which receives and supports the plurality of conduits for endwise sliding movement, and carrying means mounting the support block on the bracket means for directionally unrestricted limited movement in a plane, and for axial movement perpendicular to said plane.

The term "pivotally mounted beam member" is used generically herein to refer to either the boom member or the arm member of a device such as a hydraulic excavator, or to any other pivotally mounted beam, arm or boom of an apparatus which is used under conditions that subject that member to stresses that tend to damage rigid conduits and conduit connections.

BRIEF DESCRIPTION OF DRAWINGS

FIG. 2 is a fragmentary side elevational view of the arm beam member showing the upper conduit mounting and the intermediate conduit mounting seen on the arm in FIG. 1;

FIG. 3a is a plan view of a mounting member which is a part of the hydraulic conduit support;

FIG. 4 is a fragmentary sectional view taken substantially as indicated along the line IV—IV of FIG. 3;

FIG. 5 is a fragmentary sectional view taken substantially as indicated along the line V—V of FIG. 4;

FIG. 6 is a broken, side elevational view of the conduit mounting on the boom beam, showing all three of the mountings seen in FIG. 1;

FIG. 7 is a fragmentary plan view on an enlarged scale taken substantially as indicated along the line VII—VII of FIG. 6;

FIG. 8 is a fragmentary sectional view on an enlarged scale taken substantially as indicated along the line VIII—VIII of FIG. 7; and FIG. 9 is a fragmentary sectional view taken substantially as indicated along the line IX—IX of FIG. 8.

BEST MODE FOR CARRYING OUT THE INVENTION

Figure 1:
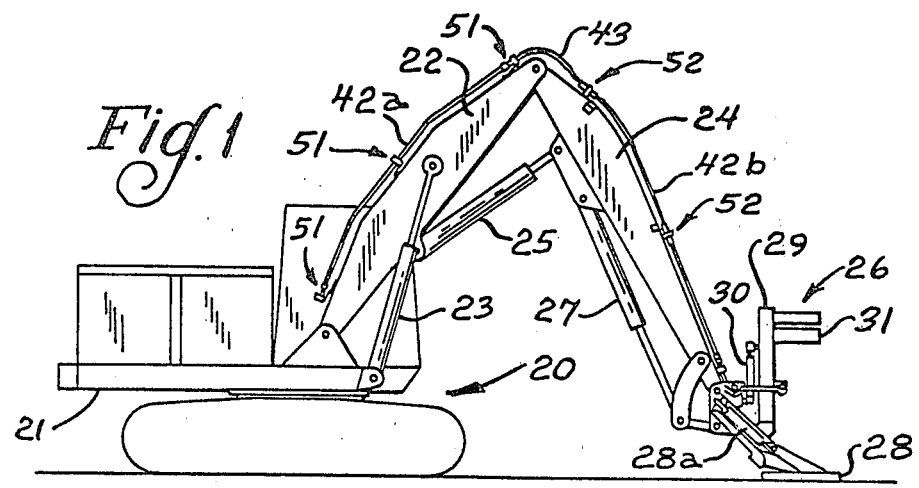
FIG. 1 is a schematic side elevational view of a tree harvesting apparatus supplied with the hydraulic conduit mounting of the present invention.

Referring first to FIG. 1 of the drawings, the apparatus of the present invention is illustrated as applied to a tree harvester of the kind disclosed in U.S. Pat. No. 4,108,224, owned by applicant's assignee. A tracktype vehicle, indicated generally at 20, includes a frame 21 upon which a boom beam (hereinafter usually termed a "boom") 22 is pivotally mounted; and a hydraulic cylinder 23 permits an operator to selectively raise and lower the boom. Pivoted on the free end of the boom 22 is an arm beam (hereinafter generally called an "arm") 24, which is movable about its pivotal connection on the boom 22 by means of a hydraulic cylinder 25. Pivotally mounted at the free end of the arm 24 is a tree harvesting mechanism, indicated generally at 26, the angular aspect of which relative to the arm 24 is controlled by a hydraulic cylinder 27. The tree harvesting mechanism 26 has various hydraulically operated components such, for example, as a shear 28 operated by cylinder 28a, a tiltable frame 29 controlled by a hydraulic cylinder 30, and hydraulically operated grapples 31. In operation, the tree harvesting apparatus 26 first grips a tree by the grapples 31, then shears it by the shear 28; and appropriate manipulations of the frame 21, the boom 22, the arm 24 and the tree harvesting apparatus 26 permit an operator to place the tree in a horizontal position alongside the machine where it may be part of a pile of several trees. A tree harvester may be used for handling trees as much as 100 feet tall, so the harvesting apparatus 26 handles very heavy loads which provide a great deal of overhung weight that tends to torsionally distort the boom and the arm in such a way as to place strains upon the mountings of the hydraulic conduits which are necessary to control operation of the cylinders 27, 28a and 30, and the cylinders for the grapples 31.

Figure 3:
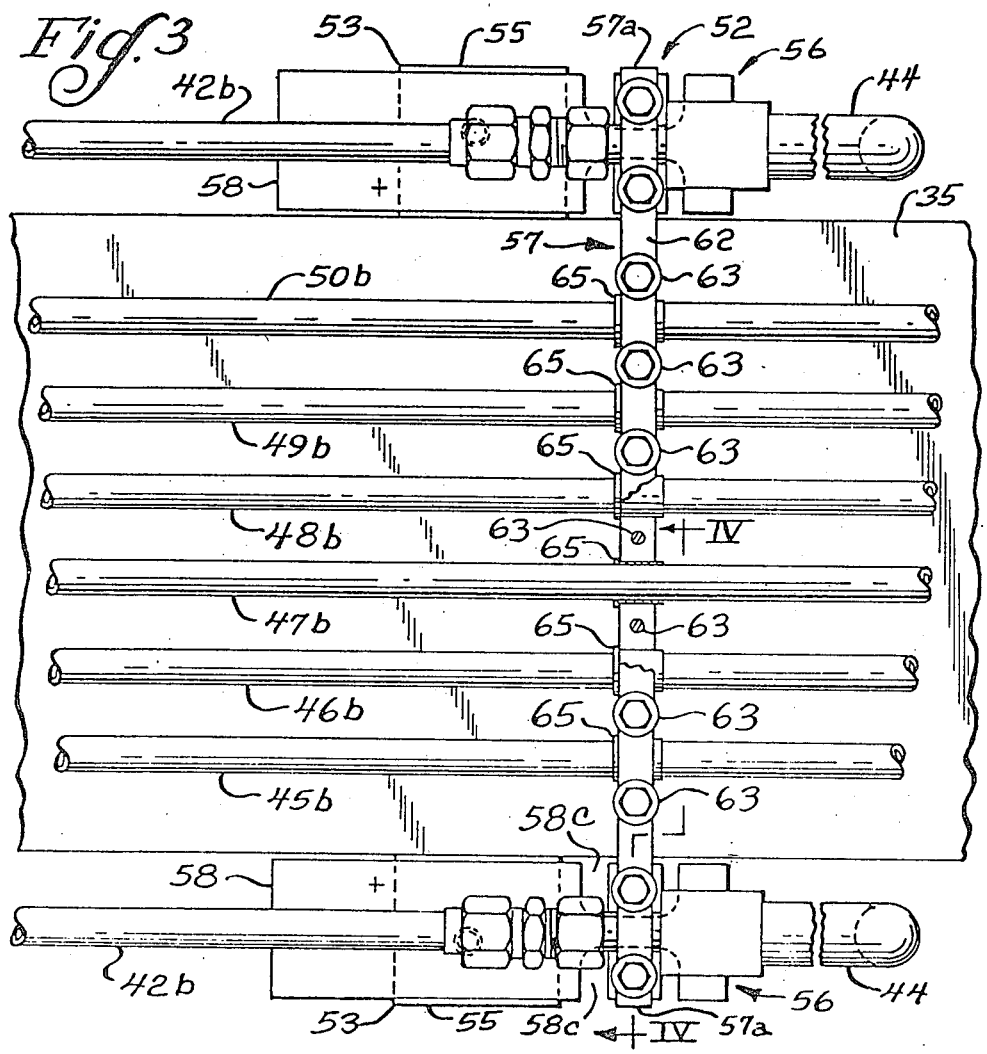
FIG. 3 is a fragmentary plan view on an enlarged scale, with parts broken away, taken substantially as indicated along the line III—III of FIG. 2.

As seen in FIGS. 6 and 7, the boom 22 is in the form of a box-like beam having a top plate 32, a bottom plate 33, and side plates such as the plate 34. As best seen in FIGS. 2 and 3, the arm 24 is also in the form of a box-like beam having a top plate 35, a bottom plate 36 and side plates such as the plate 37. A bearing boss 38 on the boom bottom plate 33 receives one end of the arm control cylinder 25; while a pair of webs 39 on the arm bottom plate 36 provides a bearing 40 for the other end of the arm control cylinder 25 and a bearing 41 for one end of the tree harvesting apparatus tilt cylinder 27.

Referring further to FIGS. 3 and 7, steel outermost hydraulic conduits 42a on the boom and 42b on the arm are connected by flexible pressure hose such as the hose 43 which bridges the pivotal connection between the boom 22 and the arm 24; and pressure hoses 44 connect the conduits 42b with the tilt control cylinder 27. Operating fluid for the various hydraulic components of the tree harvesting apparatus 26 is provided by steel conduits 45a, 46a, 47a, 48a, 49a and 50a which surmount the boom top plate 32; and by similar conduits 45b, 46b, 47b, 48b, 49b and 50b which surmount the arm top plate 35. Flexible pressure hose (not shown) which is exactly like the pressure hoses 43 and 44 connects the conduits 45a and 45b around the pivotal connection between the boom 22 and the arm 24, and there are like connections between the conduits 46a–46b, etc. All of the above identified hydraulic conduits are supported upon the hydraulic conduit mounting means of the present invention. One type of such mounting means, indicated generally at 51 in FIGS. 1 and 6 to 9, supports the conduits upon the boom 22; while another type, indicated generally at 52 in FIGS. 1 and 2 to 5, supports the conduits upon the arm 24.

Referring now particularly to FIGS. 2 to 5, the hydraulic conduit mounting means of the type 52 includes L-shaped bracket means 53 on the side plates 37 of the arm 24, each of said bracket means including a mounting arm 54 welded to the side plate 37 and a laterally outwardly extending horizontal arm 55 the top surface of which is located a short distance below the top surface of the arm top plate 35.

Supported upon the bracket arms 55 are carrying means, indicated generally at 56, which carry a hydraulic conduit support block, indicated generally at 57.

The carrying means 56 includes a mounting member 58 which is seen in FIG. 3a to have a mounting bolt hole 58a which is tapped to receive a threaded flange mounting bolt 59 the shank of which extends through a spacer collar means 60 the length of which is best seen in FIG. 5 to be slightly greater than the thickness of the bracket arms 55. A second bolt hole 58b in the mounting member 58 is for a purpose which is not directly related to the present invention. Toward one end of the mounting member 58 are clearance recesses 58c.

Each of the hydraulic conduit support blocks 57 includes a lower block member 61 and a matching upper block member 62 which are joined by bolts 63 which traverse oversized bores 62a in the upper block member 62 and screw into threaded bores 61a in the lower block member 61. The block members have confronting semicircular recesses which cooperate to define transversely spaced holes 64, six of which are provided with flanged bushings 65 to receive the conduits 45b–50b for endwise sliding movement. As best seen in FIGS. 3 and 4, the hydraulic conduit support blocks 57 have end portions 57a which extend outwardly above the clearance recesses 58c of the mounting members 58. The outer end portions 57a of the conduit support blocks 57 are seen in FIG. 4 to be provided with holes 64 which snugly receive the steel conduit 42b.

Still referring to FIG. 4, which shows one of the two identical outer end portions 57a of the hydraulic conduit support block 57, the threaded bores 61a in the outer end portion of the bottom support block member 61 are aligned with the clearance recesses 58c on opposite sides of a center web of the mounting member 58 which is between the clearance recesses, and said outer end portion of the bottom support block member 61 rests upon that center web. The carrying means 56 also includes a pair of headed bolts 66 which extend through holes in a spacer bar 67 that are somewhat larger in diameter than the bolt shanks, and also through spacer sleeves 68 into the lower parts of the threaded bores 61a in the end portions 57a of the conduit support block 57.

From the foregoing description of the mounting of the hydraulic conduit support blocks 57 it is seen that each of the bolts 59 and spacer collars 60 connects a mounting member 58 to one of the pair of aligned arms 55 for limited vertical movement that is permitted by the space between a bolt flange 59a of the bolt 59, and the underside of the arm 55. In addition, the connection of the support blocks 57 to the mounting members 58 provides for limited vertical movement between the spacer bars 67 and the underside of the mounting member 58, and for limited movement of the bolts 66 about their centers to the extent permitted by the difference in diameter between the bolt shanks and the larger holes in the spacer bars 67 through which they extend. Accordingly, such limited movement of the bolts 66 is directionally unrestricted, so each end of the support blocks 57 is free to move in a plane that is parallel to the axes of the holes 64 in the conduit support blocks 57. In addition, the spacer sleeves 68 are seen in FIGS. 4 and 5 to be somewhat longer than the thickness of the mounting member 58, so the conduit support blocks 57 may also move along the axes of the bolts 66. Thus the complete mounting assembly, including the bolts 59 and spacer collars 60, and the bolts 66, spacer bars 67 and spacer sleeves 68 are provided with clearances that allow for restricted axial movement in two different planes each of which is transverse to the plane of directionally unrestricted movement.

Turning now to FIGS. 6 to 9, the mounting of the conduits 42a and 45a to 50a upon the boom 22 is shown in detail. In this type of mounting, bracket means 69 includes a mounting arm 70 welded to the top plate 32 of the boom 22, and an upwardly offset horizontal arm 71 the bottom surface of which is in spaced relationship to the boom top plate 32.

Carrying means, indicated generally at 72, support hydraulic conduit support blocks 57.

The carrying means 72 includes a mounting bar 73 which is seen in FIGS. 7, 8 and 9 to have planar portions 74 at the ends and in a central area upon which the hydraulic conduit support block 57 rests; and there are downwardly offset intermediate bracket engaging portions 75 each of which is somewhat wider than the width of the bracket support portion 71 and slightly deeper than the thickness of said support portion.

The carrying means 72 also includes headed bolts 76 which extend through holes 74a in the planar portions 74 of the mounting bar 73 that are larger in diameter than the shanks of said bolts 76 and the bolts are screwed into the bores 61a of the conduit support block bottom member 61. There are holes 74a at each end of the mounting bar 73, and also on the longitudinal centerline of the boom.

The difference in dimensions between the two downwardly offset bracket arm engaging portions 75 of the mounting bar 73 and the bracket arms 71 affords movement of the conduit support block 57 which is of the same general type heretofore described for the conduit support blocks 57 on the carrying means 56. In addition, there can be some lateral shifting of the support blocks.

As seen in FIG. 6, the brackets 69 adjacent the two ends of the boom 22 are mounted with their support arm portions 71 facing in opposite directions, so that each of the brackets 69 limits longitudinal movement of the conduit support blocks 57 in one direction.

It is to be understood, of course, that as used in the present specification and claims, the word "movement" means relative movement between the conduit support blocks 57 and the arm 24 or the boom 22. It is the bracket means 53 or 69, rigidly fixed to the beams, that move as torsional strains are applied to the beams upon which they are rigidly mounted; and the three conduit support blocks 57 on the arm 24 remain relatively stationary with respect to one another as do the three conduit support blocks 57 on the boom 22.

INDUSTRIAL APPLICABILITY

As previously indicated, the mounting means of the present invention, when used to support rigid hydraulic conduits for devices of the type heretofore described, prevent transmission to the conduits of many of the torsional strains exerted upon the pivoted beam means of an apparatus that carries hydraulically operated mechanism for handling heavy loads and reduces vibration of the conduits which loosen the couplings. This greatly reduces the likelihood of conduit damage or leakage which could cause an expensive machine to be shut down for repairs.

I claim:

1. In a mobile apparatus (20) having a hydraulically operated, pivotally mounted beam means (24 or 22) a free end of which supports a hydraulically operated mechanism (26) for handling heavy loads, means (52 or 51) mounting a plurality of rigid hydraulic conduits (42b or a and 45b or a to 50b or a) on said beam means (24 or 22) comprising, in combination:
   bracket means (53 or 69) fixedly mounted on said beam means;
   a hydraulic conduit support block (57) having a plurality of spaced coplanar holes (64) each of which receives and supports one of said plurality of conduits for endwise sliding movement;
   and carrying means (56 or 72) mounting said support block on said bracket means, there being clearances between parts of said bracket means and parts of said carrying means to permit directionally unrestricted limited relative movement between the bracket means and the support block in a plane parallel to the plane of said coplanar holes, and relative axial movement therebetween perpendicular to said plane.

2. The combination of claim 1 in which said bracket means (53) comprises a pair of aligned arms (55) mounted on and extending laterally outwardly from opposite sides (37) of the beam means (24), and said carrying means (56) comprises two rigid mounting members (58), first bolt (59) and spacer (60) means connecting each said mounting member (58) to one of said arms (55) for limited movement along the axis of each bolt (59) of said first bolt and spacer means, and second bolt (66) and spacer (67 and 68) means connecting opposite end portions of said conduit support block (57) to said mounting members (56) for said directionally unrestricted limited movement about the longitudinal axis of each bolt (66) of said second bolt and spacer means.

3. The combination of claim 2 in which said second bolt (66) and spacer (67 and 68) means allows for limited movement of each of the opposite end portions of said conduit support block along the axis of each bolt (66) of said second bolt and spacer means, and said first bolt (59) and spacer (60) means and said second bolt (66) and spacer (67 and 68) means are in different planes that are transverse to said plane.

4. The combinaton of claim 1 in which the longitudinal axes of the rigid hydraulic conduits (42b or a and 45b or a to 50b or a) are substantially parallel to a top surface (35 or 32) means of the beam (24 or 22) means and said plane is also substantially parallel to said top surface.

5. The combination of claim 4 in which said bracket means (53) comprises a pair of aligned arms (55) mounted on and extending laterally outwardly from opposite sides (37) of the beam means (24), and said carrying means (56) comprises two rigid mounting members (58), a first bolt (59) and spacer (60) means connecting each said rigid mounting member (58) to one of said arms (55) for limited movement along the axis of each bolt (59) of said first bolt and spacer means, and second bolt (66) and spacer (67 and 68) means connecting opposite end portions of said conduit support block (57) to said mounting members (56) for said directionally unrestricted limited movement about the longitudinal axis of each bolt (66) of said second bolt and spacer means.

6. The combination of claim 1 in which the bracket means comprises a bracket plate (69) having a fastening portion (70) abutting and fixed to a top surface (32) of the beam means (22) and an integral support arm portion (71) substantially parallel to said top surface, and the carrying means (72) comprises a rigid mounting bar (73) which has portions (74) abutting and secured to the underside of said conduit support block (57) and an intermediate bracket arm engaging portion (75) slightly wider than the width of said support arm portion (71) and spaced from said underside by a distance slightly greater than the thickness of said support arm portion, and limiting means (69—69) are provided for restricting movement of said conduit support block (57) longitudinally of the support portion.

7. The combination of claim 6 in which said limiting means comprises a second conduit support block (57) spaced longitudinally of the conduits from said conduit support block (57), a second bracket plate (69) which has its fastening portion (70) closest to the fastening portion (70) of the first bracket plate (69), and means (72) securing said second conduit support block (57) to said second bracket plate (69), whereby each bracket plate (69) limits movement of the conduit support blocks (57) longitudinally in one direction.

* * * * *